the# United States Patent
Yang et al.

(10) Patent No.: US 8,451,799 B2
(45) Date of Patent: May 28, 2013

(54) SECURITY UPDATE PROCEDURE FOR ZONE SWITCHING IN MIXED-MODE WIMAX NETWORK

(75) Inventors: Xiangying Yang, Portland, OR (US); Avishay Sharaga, Beit Nehemya (IL); Chang Hong Shan, Shanghai (CN); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 12/855,400

(22) Filed: Aug. 12, 2010

(65) Prior Publication Data

US 2011/0110329 A1 May 12, 2011

Related U.S. Application Data

(60) Provisional application No. 61/259,086, filed on Nov. 6, 2009.

(51) Int. Cl.
*H04W 84/12* (2009.01)
(52) U.S. Cl.
USPC .......... 370/331; 370/338; 370/328; 455/436; 455/444; 455/450; 455/438
(58) Field of Classification Search
CPC ....... H04W 36/18; H04W 92/02; H04W 88/14; H04B 7/2643
USPC ................. 370/331, 338, 328; 455/436, 444, 455/450, 438; 380/44, 270
See application file for complete search history.

(56) References Cited

U.S. PATENT DOCUMENTS

| | | | |
|---|---|---|---|
| 7,391,776 B2 | 6/2008 | Venkatachalam et al. |
| 7,414,976 B2 | 8/2008 | Venkatachalam et al. |
| 7,499,426 B2 | 3/2009 | Venkatachalam |
| 7,548,507 B2 | 6/2009 | Pandoh et al. |
| 7,633,904 B2 | 12/2009 | Venkatachalam |
| 7,636,577 B2 | 12/2009 | Mohanty et al. |
| 7,693,555 B2 | 4/2010 | Srinivasan et al. |
| 7,706,800 B2 | 4/2010 | Sharaga |
| 7,720,490 B2 | 5/2010 | Venkatachalam |
| 7,725,115 B2 | 5/2010 | Venkatachalam |
| 7,746,896 B2 | 6/2010 | Venkatachalam |
| 7,782,817 B2 | 8/2010 | Yang et al. |

(Continued)

OTHER PUBLICATIONS

Friedlander, et al., "Use-Entered Credentials for a Mobile Station in a Wireless Network", U.S. Appl. No. 12/873,015, filed Aug. 31, 2010, 34 Pages.

(Continued)

*Primary Examiner* — Ricky Ngo
*Assistant Examiner* — Rasheed Gidado
(74) *Attorney, Agent, or Firm* — Carrie A. Boone, P.C.

(57) ABSTRACT

A zone switching method is disclosed for use in a mixed-mode WiMAX environment. The zone switching method is useful in a WiMAX network having both 802.16e (legacy) and 802.16e/802.16m (mixed-mode, or advanced) entities, including mobile stations, base stations, and access service network entities. The zone switching method includes anchor authenticator relocation, dual security context maintenance, and security updates for both entry-before-break-capable mobile stations and for those mobile stations with slower switching speeds. The zone switching method enables an advanced mobile station to seamlessly switch from legacy to mixed-mode operation once the mixed-mode entities are available to service the 802.16m operations.

18 Claims, 10 Drawing Sheets

U.S. PATENT DOCUMENTS

| | | |
|---|---|---|
| 7,787,891 B2 | 8/2010 | Taaghol et al. |
| 7,804,799 B2 | 9/2010 | Venkatachalam et al. |
| 7,809,355 B2 | 10/2010 | Mohanty et al. |
| 7,826,404 B2 | 11/2010 | Puthenkulam et al. |
| 7,852,794 B2 | 12/2010 | Venkatachalam |
| 7,860,469 B2 | 12/2010 | Mohanty et al. |
| 7,885,210 B2 | 2/2011 | Yang et al. |
| 2005/0010676 A1 | 1/2005 | Venkatachalam et al. |
| 2005/0129020 A1 | 6/2005 | Doyle et al. |
| 2006/0221978 A1 | 10/2006 | Venkatachalam |
| 2007/0003062 A1* | 1/2007 | Mizikovsky et al. ......... 380/270 |
| 2007/0086434 A1 | 4/2007 | Venkatachalam et al. |
| 2007/0087767 A1 | 4/2007 | Pareek et al. |
| 2007/0097205 A1 | 5/2007 | Venkatachalam |
| 2007/0104132 A1 | 5/2007 | Rajagopalan et al. |
| 2007/0105567 A1 | 5/2007 | Mohanty et al. |
| 2007/0105600 A1 | 5/2007 | Mohanty et al. |
| 2007/0121567 A1 | 5/2007 | Venkatachalam et al. |
| 2007/0191031 A1 | 8/2007 | Mohanty et al. |
| 2007/0245025 A1 | 10/2007 | Venkatachalam |
| 2007/0259692 A1 | 11/2007 | Venkatachalam |
| 2007/0298806 A1 | 12/2007 | Venkatachalam |
| 2008/0014981 A1 | 1/2008 | Venkatachalam |
| 2008/0019312 A1 | 1/2008 | Venkatachalam et al. |
| 2008/0019394 A1 | 1/2008 | Rengarajan et al. |
| 2008/0037460 A1 | 2/2008 | Venkatachalam |
| 2008/0037480 A1 | 2/2008 | Venkatachalam |
| 2008/0056219 A1 | 3/2008 | Venkatachalam |
| 2008/0080371 A1 | 4/2008 | Liu et al. |
| 2008/0084814 A1 | 4/2008 | Venkatachalam |
| 2008/0084941 A1 | 4/2008 | Mohanty et al. |
| 2008/0096614 A1 | 4/2008 | Venkatachalam |
| 2008/0101213 A1 | 5/2008 | Mohanty et al. |
| 2008/0101285 A1 | 5/2008 | Venkatachalam et al. |
| 2008/0107092 A1 | 5/2008 | Taaghol et al. |
| 2008/0108321 A1 | 5/2008 | Taaghol et al. |
| 2008/0108336 A1 | 5/2008 | Venkatachalum et al. |
| 2008/0151789 A1 | 6/2008 | Venkatachalam et al. |
| 2008/0159220 A1 | 7/2008 | Kitchin et al. |
| 2008/0214213 A1 | 9/2008 | Etemad et al. |
| 2008/0219189 A1 | 9/2008 | Kitchin et al. |
| 2008/0219216 A1 | 9/2008 | Taaghol et al. |
| 2008/0232288 A1 | 9/2008 | Venkatachalam et al. |
| 2008/0232401 A1 | 9/2008 | Ahmadi et al. |
| 2008/0259835 A1 | 10/2008 | Venkatachalam et al. |
| 2008/0279127 A1 | 11/2008 | Venkatachalam et al. |
| 2008/0279136 A1 | 11/2008 | Taaghol et al. |
| 2008/0310381 A1 | 12/2008 | Taaghol et al. |
| 2008/0310386 A1 | 12/2008 | Venkatachalam |
| 2008/0311881 A1 | 12/2008 | Taaghol et al. |
| 2008/0311891 A1 | 12/2008 | Venkatachalam et al. |
| 2008/0311909 A1 | 12/2008 | Taaghol et al. |
| 2009/0003255 A1 | 1/2009 | Mohanty et al. |
| 2009/0003285 A1 | 1/2009 | Mohanty et al. |
| 2009/0034526 A1 | 2/2009 | Ahmadi et al. |
| 2009/0040970 A1 | 2/2009 | Ahmadi et al. |
| 2009/0088177 A1 | 4/2009 | Yang et al. |
| 2009/0154457 A1 | 6/2009 | Kolekar et al. |
| 2009/0168745 A1 | 7/2009 | Ahmadi et al. |
| 2009/0168754 A1 | 7/2009 | Shan |
| 2009/0168907 A1 | 7/2009 | Mohanty et al. |
| 2009/0271626 A1* | 10/2009 | Wang ........................... 713/170 |
| 2009/0274105 A1 | 11/2009 | Choi et al. |
| 2009/0274134 A1* | 11/2009 | Wang et al. .................. 370/338 |
| 2009/0323570 A1 | 12/2009 | Ginzburg et al. |
| 2009/0323602 A1 | 12/2009 | Li et al. |
| 2009/0323651 A1 | 12/2009 | Sharaga et al. |
| 2009/0323770 A1 | 12/2009 | Venkatachalam et al. |
| 2009/0327767 A1 | 12/2009 | Ginzburg et al. |
| 2010/0005354 A1 | 1/2010 | Zhu et al. |
| 2010/0008325 A1 | 1/2010 | Hartman et al. |
| 2010/0008328 A1* | 1/2010 | Maheshwari et al. ........ 370/331 |
| 2010/0056154 A1 | 3/2010 | Venkatachalam |
| 2010/0056182 A1 | 3/2010 | Venkatachalam |
| 2010/0098025 A1* | 4/2010 | Chen et al. .................... 370/331 |
| 2010/0098247 A1* | 4/2010 | Suumaki ......................... 380/44 |
| 2010/0103825 A1 | 4/2010 | Taaghol et al. |
| 2010/0111047 A1 | 5/2010 | Yang et al. |
| 2010/0111053 A1 | 5/2010 | Avital et al. |
| 2010/0128704 A1 | 5/2010 | Taaghol et al. |
| 2010/0157906 A1 | 6/2010 | Yang et al. |
| 2010/0166183 A1 | 7/2010 | Johnston et al. |
| 2010/0172291 A1 | 7/2010 | Kim et al. |
| 2010/0173631 A1 | 7/2010 | Kim et al. |
| 2010/0208831 A1 | 8/2010 | Zhu et al. |
| 2010/0226311 A1 | 9/2010 | Yang et al. |
| 2010/0227618 A1* | 9/2010 | Yang et al. .................... 455/438 |
| 2010/0275085 A1 | 10/2010 | Venkatachalam et al. |
| 2010/0279717 A1 | 11/2010 | Venkatachalam et al. |
| 2010/0316030 A1 | 12/2010 | Venkatachalam et al. |
| 2010/0331000 A1 | 12/2010 | Zhu et al. |
| 2011/0002239 A1 | 1/2011 | Venkatachalam |
| 2011/0002297 A1 | 1/2011 | Jain et al. |
| 2011/0002298 A1 | 1/2011 | Venkatachalam et al. |
| 2011/0002299 A1 | 1/2011 | Venkatachalam |
| 2011/0003591 A1 | 1/2011 | Venkatachalam et al. |
| 2011/0003595 A1 | 1/2011 | Shan |
| 2011/0004747 A1 | 1/2011 | Venkatachalam |
| 2011/0004760 A1 | 1/2011 | Sharaga et al. |
| 2011/0026501 A1 | 2/2011 | Sharaga et al. |
| 2011/0032869 A1 | 2/2011 | Natan et al. |
| 2011/0044213 A1 | 2/2011 | Venkatachalam et al. |
| 2011/0044229 A1 | 2/2011 | Etemad et al. |
| 2011/0044307 A1 | 2/2011 | Mohanty et al. |
| 2011/0045763 A1 | 2/2011 | Mohanty et al. |
| 2011/0047289 A1 | 2/2011 | Venkatachalam et al. |

OTHER PUBLICATIONS

Shan,"Wifi and Wimax Internetworking", U.S. Appl. No. 12/629,097, filed Dec. 2, 2009, 20 Pages.

* cited by examiner

SECURITY UPDATE PROCEDURE FOR ZONE SWITCHING IN MIXED-MODE WIMAX NETWORK

CROSS-REFERENCE TO RELATED APPLICATIONS

This application claims priority under 35 U.S.C. 119(e) to U.S. Provisional Patent Application No. 61/259,086, filed on Nov. 6, 2009.

TECHNICAL FIELD

This application relates to zone switching between IEEE 802.16e and 802.16m and, more particularly, performing security updates in conjunction with zone switching operations.

BACKGROUND

WiMAX, short for worldwide interoperability for microwave access, is currently defined by the Institute of Electrical and Electronics Engineers, or IEEE, 802.16-series specification. Mobile WiMAX, under 802.16e, permits broadband wireless access for mobile users, while 802.16m is the advanced air interface standard. Base stations and mobile stations may support 802.16e only standard (legacy) or mixed standards (802.16e and 802.16m).

Zone switching is a method for IEEE 802.16m-capable mobile stations to switch from a legacy 802.16e (mobile WiMAX) zone to an 802.16m (advanced air interface) zone in a mixed-mode 802.16m base station that offers legacy support. A zone switching operation enables an 802.16m mobile station to perform handover from a legacy base station to an 802.16m base station. The 802.16m mobile station first performs a 802.16e-to-802.16e handover, then performs an 802.16e-to-802.16m zone switch at the same base station. This provides flexibility for the base station to balance its load between the 802.16e zone and the 802.16m zone, without changing its 16e/16m zone ratio, which is a major configuration change that should not happen very often.

To enable zone switching, a non-trivial issue to be resolved is how to perform a security update. The advanced air interface standard (802.16m) uses a different security key hierarchy than the mobile WiMAX standard (802.16e). Furthermore, for network deployment, the access service network gateway (ASN-GW) and authenticator may be in the mixed mode as well, such that the mobile station does not have knowledge about whether its current anchor authenticator access service network (AA ASN) is 16m-capable or not, even if it is currently associated with a 16m base station in its 16e zone.

Thus, there is a continuing need for a method to ensure a security update is properly performed before an 802.16e-to-802.16m zone switch is triggered.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a zone switching method is disclosed for use in a mixed-mode WiMAX environment. The zone switching method is useful in a WiMAX network having both 802.16e (legacy) and 802.16e/802.16m (mixed-mode, or advanced) entities, including mobile stations, base stations, and access service networks. The zone switching method includes anchor authenticator relocation, dual security context maintenance, and security updates for both entry-before-break-capable mobile stations and for those mobile stations with slower switching speeds. The zone switching method enables an advanced mobile station to seamlessly switch from legacy to mixed-mode operation once the mixed-mode entities are available to service the 802.16m operations.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
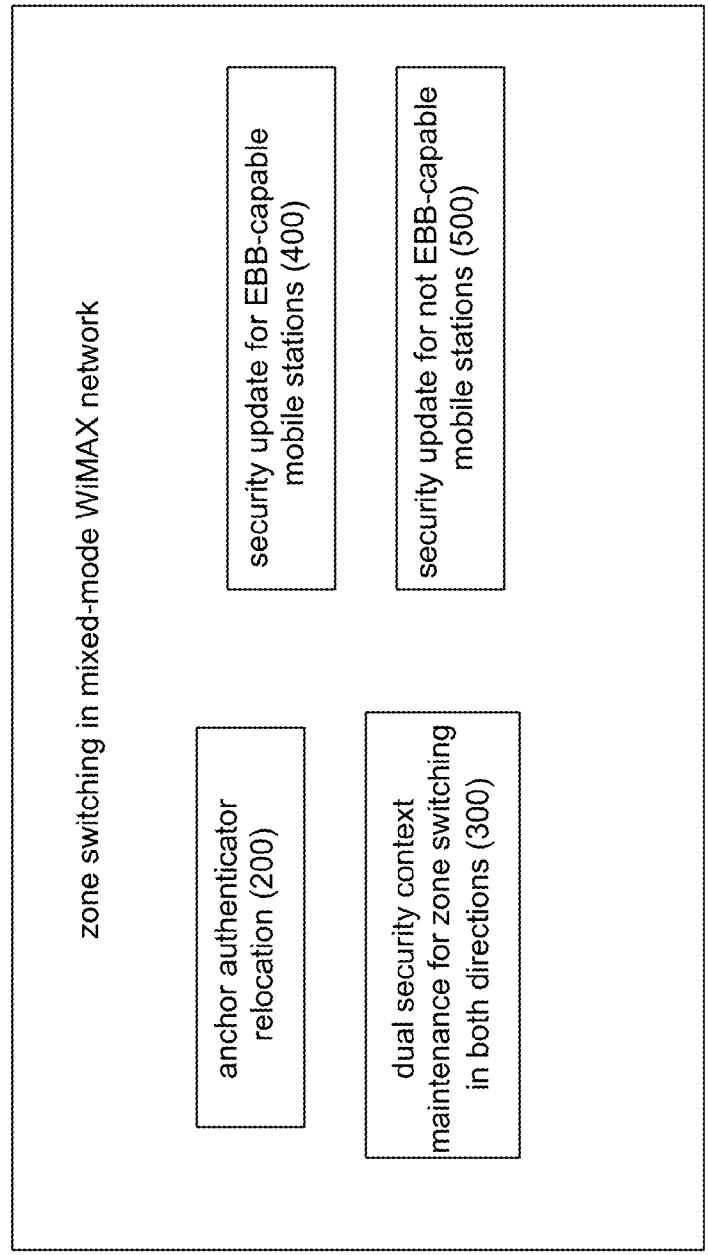
FIG. 1 is a block diagram of a zone switching method to be used in a mixed-mode WiMAX network, according to some embodiments.

FIG. 1 is a block diagram of a zone switching method 100, according to some embodiments, for use in a mixed-mode WiMAX network. The zone switching method 100 includes anchor authenticator relocation 200, the maintenance of dual security contexts 300, security updates for EBB-capable mobile stations 400, and security updates for non-EBB-capable mobile stations 500. Each of these operations is described in more detail below.

Mixed-mode Deployment Scenario

IEEE 802.16m/16e Mixed-mode Air Interface

As the mobile WiMAX (802.16e) standard is upgraded to the advanced air interface (802.16m) standard, it is likely that network engineers will upgrade their network in stages. Therefore, a mixed-mode air interface may contain IEEE802.16e-only legacy base stations as well as IEEE802.16e/16m mixed-mode advanced base stations (ABS) co-existing in the same geographical area, with the frame structure being aligned for backwards compatibility. The zone switching method 100 described herein is designed to operate in such environments, as well as in networks featuring only mixed-mode 16e/16m base stations.

Figure 2:
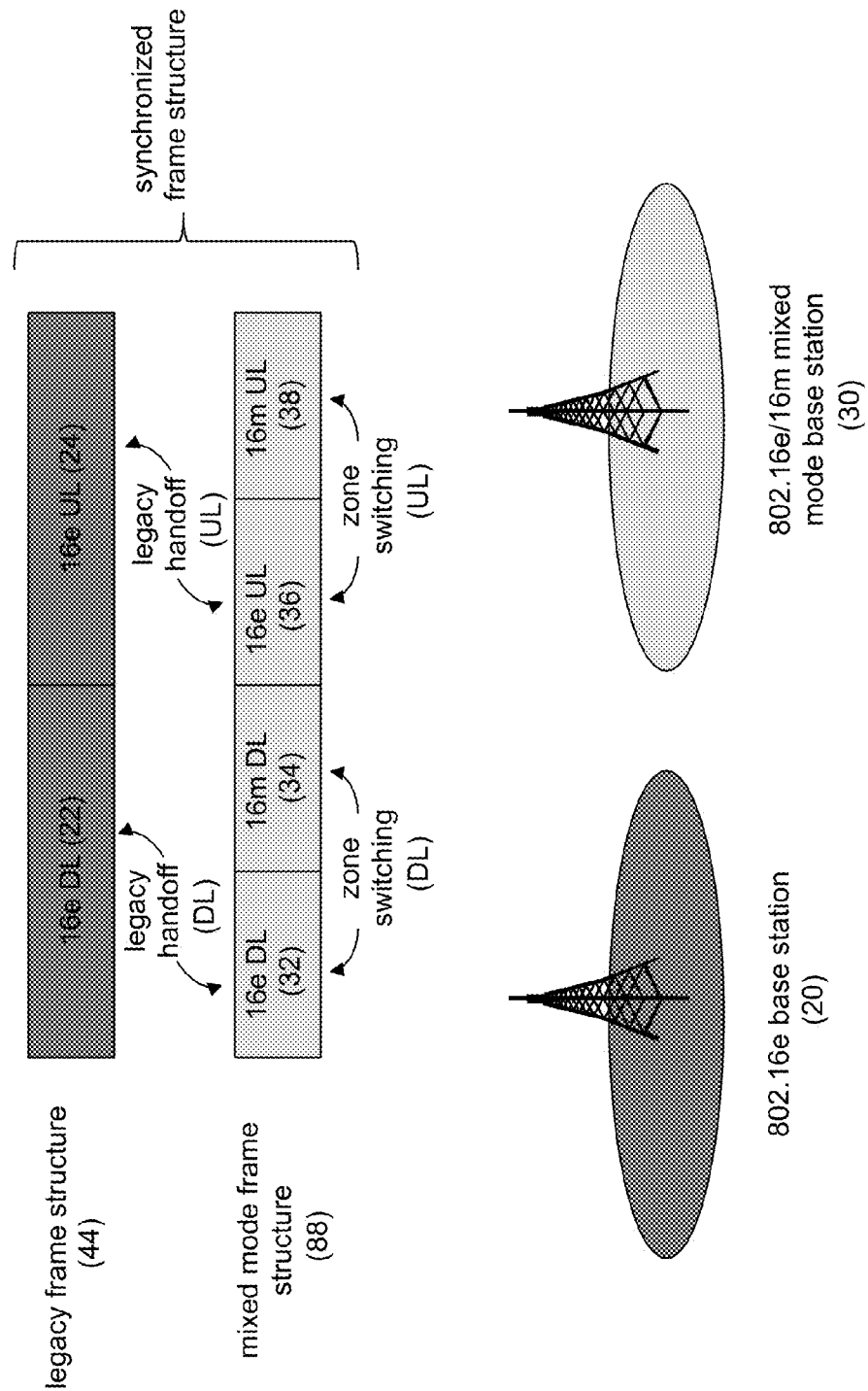
FIG. 2 is a schematic diagram of a mixed-mode data interface for 802.16e- and 802.16m-capable entities in a mixed-mode WiMAX network, according to some embodiments.

FIG. 2 is a schematic diagram illustrating a typical cellular configuration 50 having both legacy base stations and mixed-mode base stations simultaneously occupying a WiMAX network, according to some embodiments. In several of the Figures described herein, a blue color coding is meant to denote a legacy entity while a yellow color coding denotes a mixed-mode entity supporting both 802.16e and 802.16m. Two base stations are depicted in FIG. 2, an 802.16e base station 20 and an 802.16e/16m mixed-mode base station 30. The data interface used by the base stations, a synchronized frame structure, is shown for each type of base station. The synchronized frame structure of the 16e base station 20 (legacy frame structure 44) has a 16e downlink (DL) portion 22 and a 16e uplink (UL) portion 24 while the synchronized frame structure of the 16e/16m mixed-mode base station 30 (mixed-mode frame structure 88) has a 16e DL portion 32, a 16m DL portion 34, a 16e UL portion 36, and a 16m UL portion 38.

A mobile station operating in the WiMAX network 50 of FIG. 2 performs the following zone switching operations. In some embodiments, the 16m-capable mobile station first performs a handoff from the legacy frame structure 44 of the legacy base station 20 to the mixed-mode frame structure 88 of the mixed-mode base station 30. For downlink operations, this would be a handoff from the 16e DL 22 of the legacy frame structure 44 to the 16e DL 32 of the mixed-mode frame structure 88; for uplink operations, the handoff would be from the 16e UL 24 of the legacy frame structure 44 to the 16e UL 36 of the mixed-mode frame structure 88. Notice that this first handoff is an 802.16e-to-802.16e handoff, since the mixed-mode base station 30 has both 16e and 16m allocations in its frame structure 88. Next, in some embodiments, a 16e-to-16m zone switch is performed within the mixed-mode base station 30. So, from within the mixed-mode frame structure 88, a handoff from the 16e DL 32 to the 16m DL 34 is made for downlink operations; a handoff from the 16e UL 36 to the 16m UL 38 is made for uplink operations.

IEEE 802.16m/16e Mixed-mode Network Deployment In addition to having base stations and mobile stations with different capabilities, there also exist network entities to support the mobile WiMAX (802.16e) and advanced air interface (802.16m) standards, with some network entities supporting only mobile WiMAX and others being mixed-mode networks, and supporting both the mobile WiMAX and advanced air interface standards. For the 802.16e base station 20 and mixed-mode base station 30 (FIG. 2) to operate, the WiMAX network 50 includes at least one access service network gateway (ASN-GW). The ASN-GW may support 802.16e only (legacy) or be a mixed-mode gateway supporting both 802.16e and 802.16m.

Figure 3A:
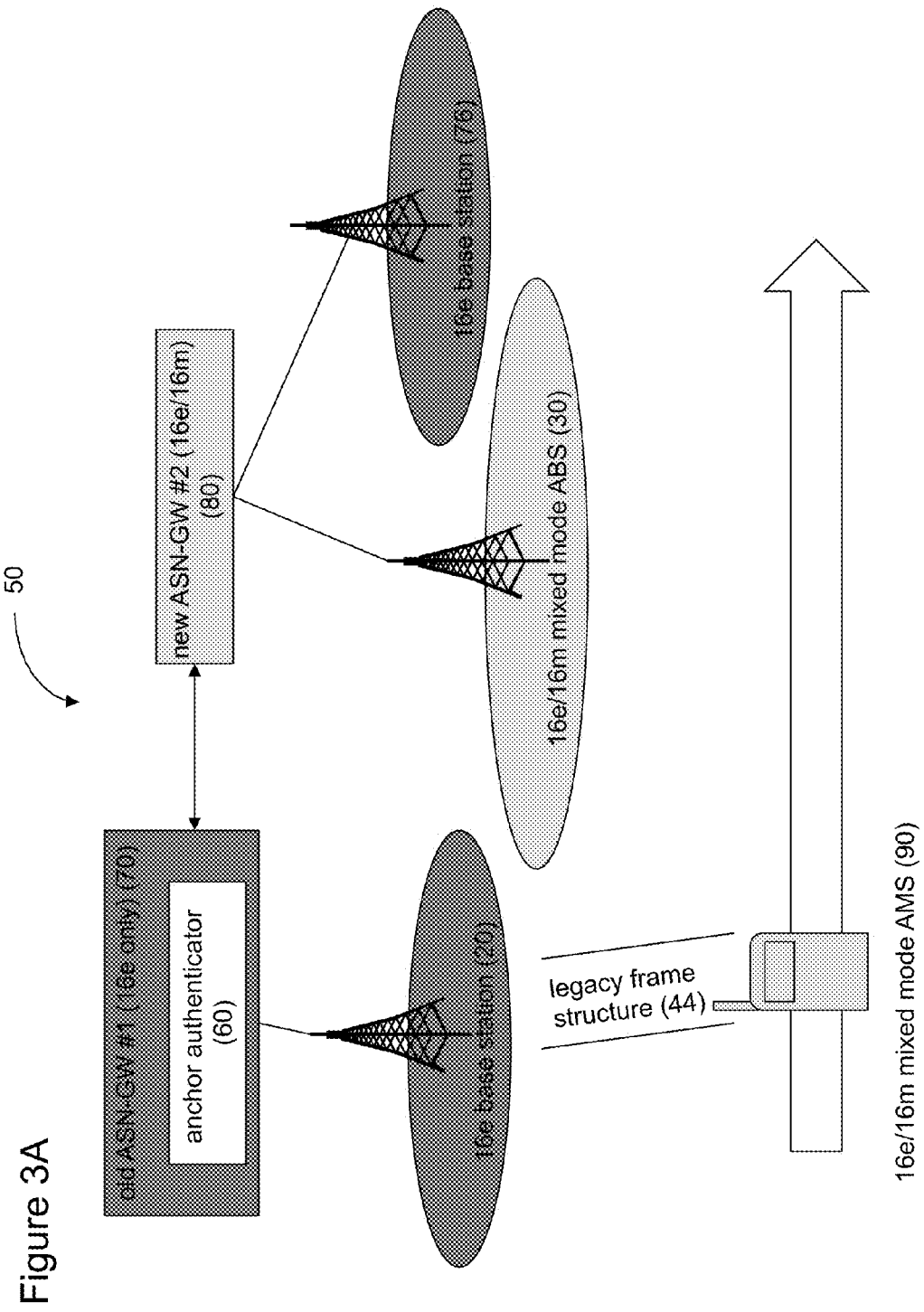
FIGS. 3A-3C are schematic diagrams of the WiMAX network of FIG. 2 in which anchor authenticator relocation of the zone switching method of FIG. 1 is performed, according to some embodiments.
Figure 3B:
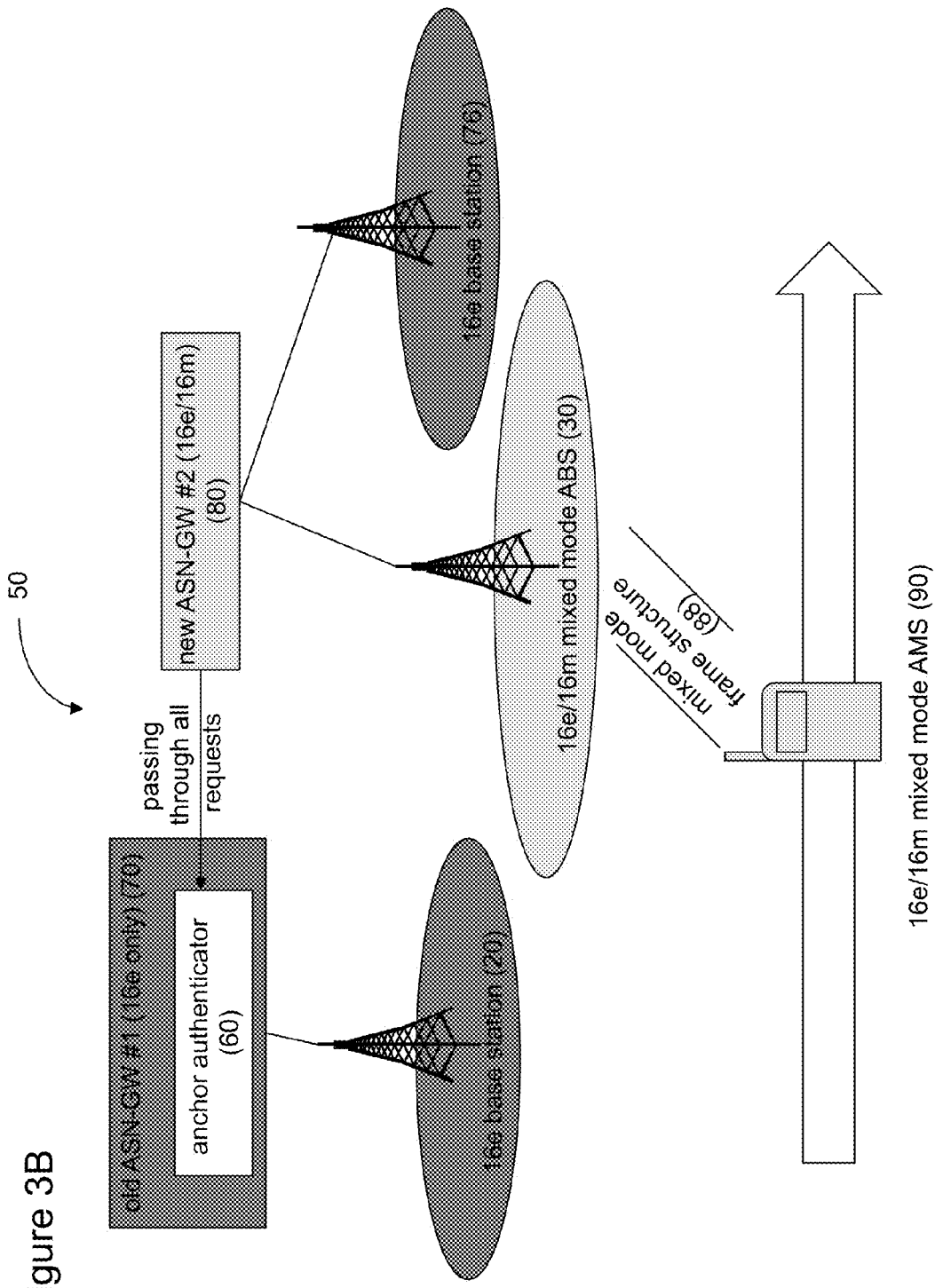
Figure 3C:
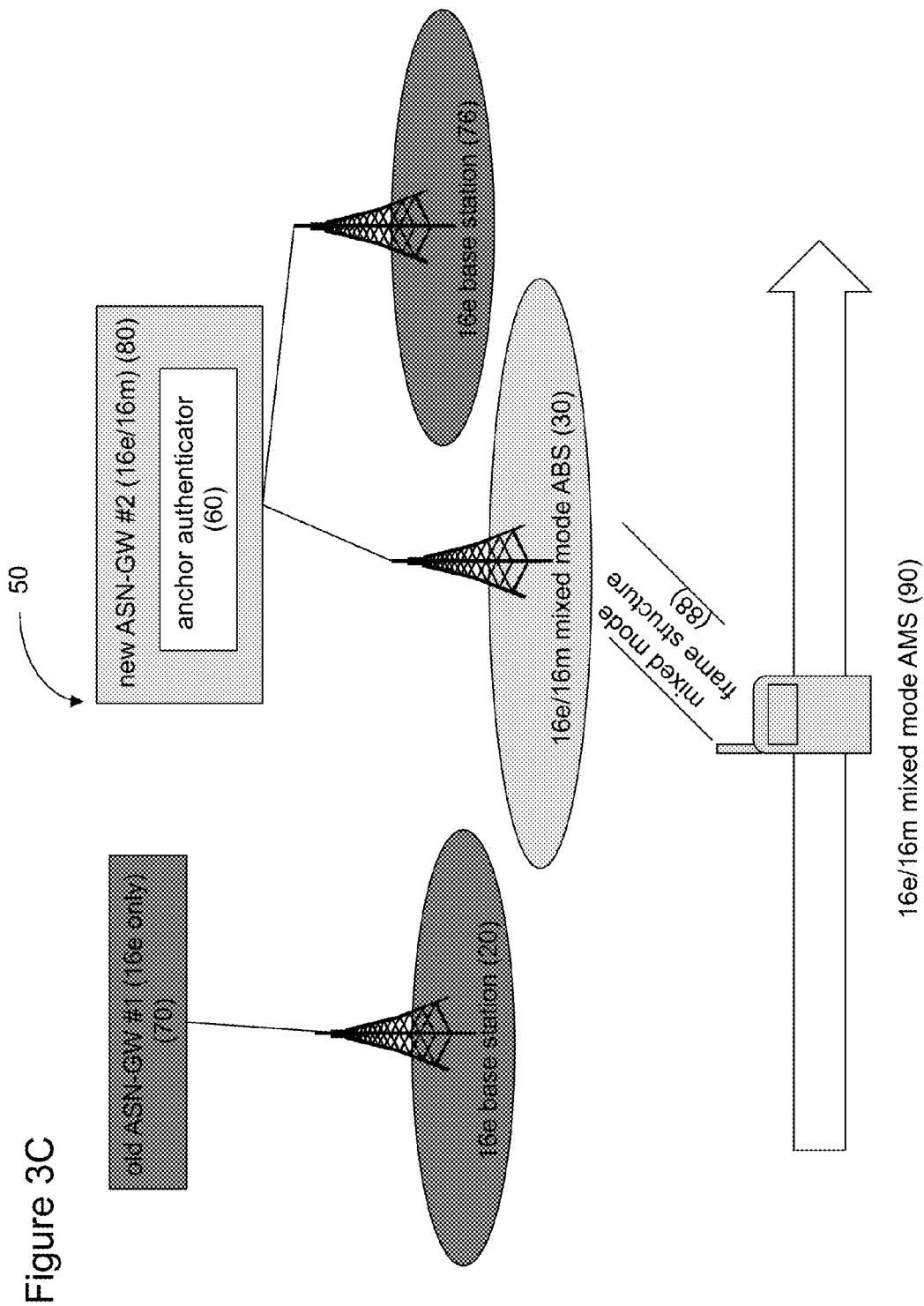

FIGS. 3A-3C are schematic diagrams of the WiMAX network 50, this time showing both legacy 70 and mixed-mode 80 access service network gateways (ASN-GW), as well as a 802.16m-capable mobile station 90, according to some embodiments. An old (legacy) ASN-GW 70 supports 802.16e only, and services the legacy base station 20 first introduced in FIG. 2. A new ASN-GW 80 supports 802.16e or 802.16m, and supports both a second legacy base station 76 and the mixed-mode ABS 30, also from FIG. 2. The legacy ASN-GW 70 is not forward-compatible with 802.16m, but the mixed-mode ASN-GW 80 is backwards-compatible with 802.16e.

Each mobile station in the WiMAX network 50 has an anchor authenticator. The anchor authenticator associates the mobile station with its ASN-GW. In the deployment shown in FIG. 3A, an anchor authenticator 60 associates the mobile station 90 with the old ASN-GW 70. If the mobile station 90 only performs an 802.16e handoff from the base station 20 to the mixed-mode base station 30, then its anchor authenticator may still be anchored at the legacy ASN-GW 70. This incurs a problem for future zone switching for the 16m-capable mobile station 90. Furthermore, zone switching requires security keys to be updated according to the 802.16m specification. Finally, the anchor authenticator access service network (AA-ASN) must be 802.16m-compatible in order for the mobile station 90 to exploit its advanced capabilities.

FIGS. 3A-3C depict movement of the mobile station 90, and show how the anchor authenticator 60 affects whether the mobile station will be able to use its enhanced features. In FIG. 3A, the mobile station 90 communicates with the 16e base station 20 using the legacy frame structure 44 (FIG. 2). The anchor authenticator 60 is located at the legacy ASN-GW 70. In FIG. 3B, the mobile station 90 is moving, such that it is in the range of the mixed-mode base station 30. Following the handoff and zone switching operations described above and depicted in FIG. 2, the mobile station 90 is able to communicate with the ABS 30 using the mixed-mode frame structure 88. However, notice in FIG. 3B that the anchor authenticator 60 is still located at the legacy ASN-GW 70. The ABS 30 is tied to the new ASN-GW 80. However, since the anchor authenticator 60 has not been moved, the old ASN-GW 70 still services any operations from the mobile station 90. This means that the new ASN-GW 80 is merely a dummy relay node, passing all operational requests through to the old ASN-GW 70.

It is not until the anchor authenticator 60 has been moved to the new ASN-GW 80, as depicted in FIG. 3C, that the enhanced 16m features of the mobile station 90 may be realized. In FIG. 3C, the new ASN-GW 80 does not operate as a dummy relay node, but instead services all operations coming from the mobile station 90, since the anchor authenticator 60 belonging to the mobile station 90 now resides in the ASN-GW 80. The scenario described in FIGS. 3A-3C serve as the motivation for the anchor authenticator relocation operations 200 performed by the zone switching method of FIG. 1. The anchor authenticator relocation 200 is described in more detail below.

Anchor Authenticator Relocation in the Network for 16e->16m Zone Switching

In some embodiments, the zone switching method 100 performs one of two network anchor authenticator relocation operations 200A or 200B (collectively, anchor authenticator relocation 200, or relocation 200) to support the zone switching scenario described above. For 16e-to-16m zone switching, if the anchor authenticator is still located at a legacy ASN, the anchor authenticator operations 200 are performed before any 802.16m capability may be realized by the mobile station 90.

Relocating a mobile station's AA-ASN is typically a network decision that is transparent to the mobile station. The decision may be made based on the logical distance of the current relay ASN (e.g., the ASN 80) to the AA ASN (e.g. the ASN 70). To ensure proper zone switching preparation, the anchor authenticator relocation 200 of the zone switching method 100 introduces additional triggers, which enable the network to perform the relocation procedure.

In some embodiments, once the network detects that the 16m mobile station 90 (which is known to the network via its medium access control, or MAC, version) performs a handover from the 16e base station 20 to the 16e/16m mixed-mode base station 30, the network ensures that the AA ASN of this mobile station is the new ASN that supports both 16e and 16m (e.g., the ASN 80 in FIGS. 3A-3C). The initial handover and zone switching operations depicted in FIG. 2 thus trigger the network to make the change to the anchor authenticator 60. Alternatively, the mobile station 90 may perform authentication or re-authentication in the 16e zone 32 (FIG. 2) of the 16e/16m mixed-mode base station 30. If the current AA-ASN is not yet a 16m-compatible new ASN, the network may trigger AA-ASN relocation once the mobile station 90 initiates (re)authentication.

Authentication and re-authentication refer to procedures for mutual identity verification between the mobile station and the network. As used herein, authentication and re-authentication refer to setting up and refreshing, respectively, a master session key (MSK) and a pairwise master key (PMK) between the mobile station and the ASN-GW, as well as an authentication key (AK) between the base station 30 and the mobile station 90. If the mobile station 90 comes from an 802.16e network (e.g., with the anchor 70) and wants to be later served in the 802.16m zone of the mixed-mode base station 30, the mobile station must have its PMK and subordinate keys (AK and others) derived according to the 802.16m specification.

Figure 4A:
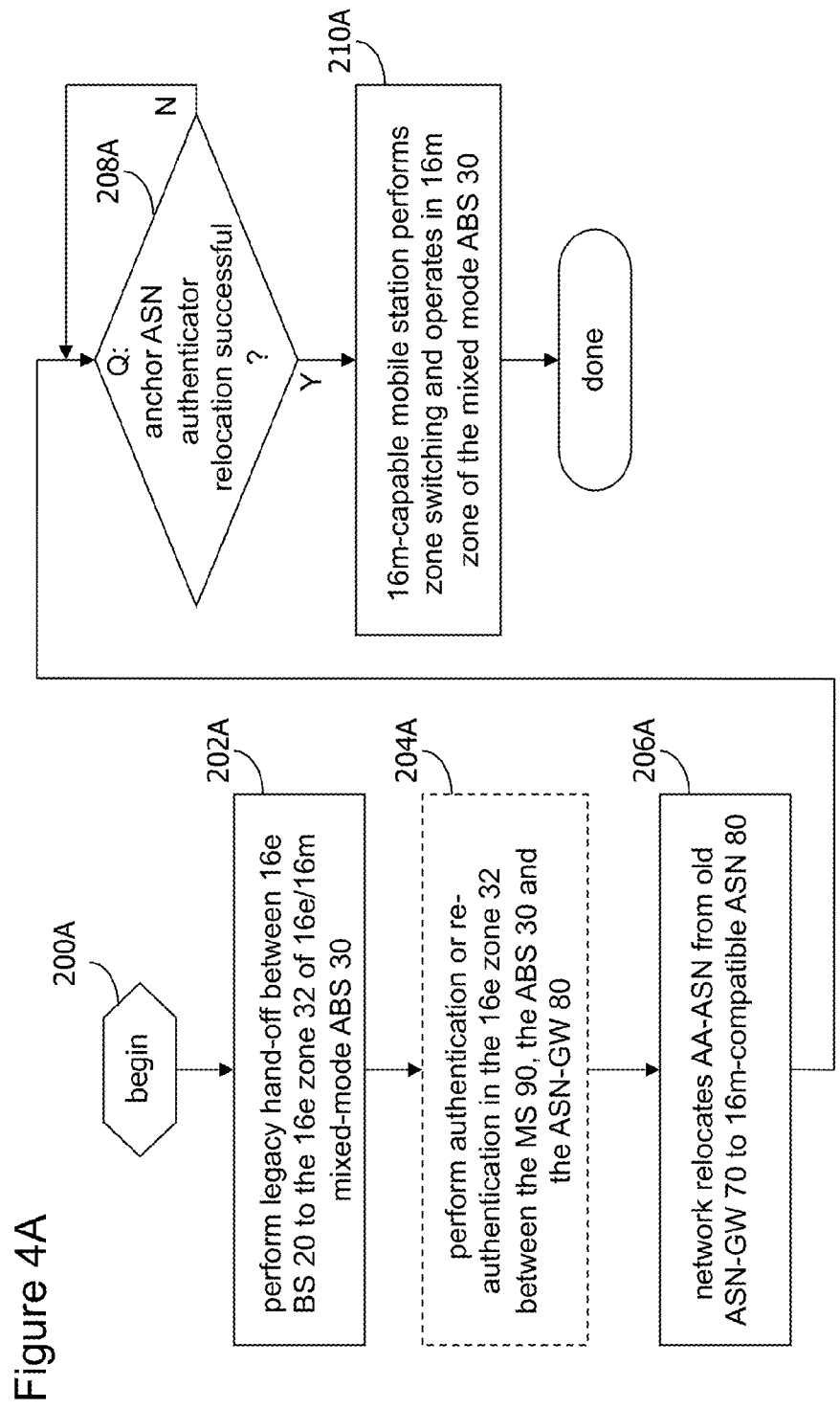
FIGS. 4A and 4B are flow diagrams showing alternative anchor authenticator relocation operations performed by the zone switching method of FIG. 1, according to some embodiments.
Figure 4B:
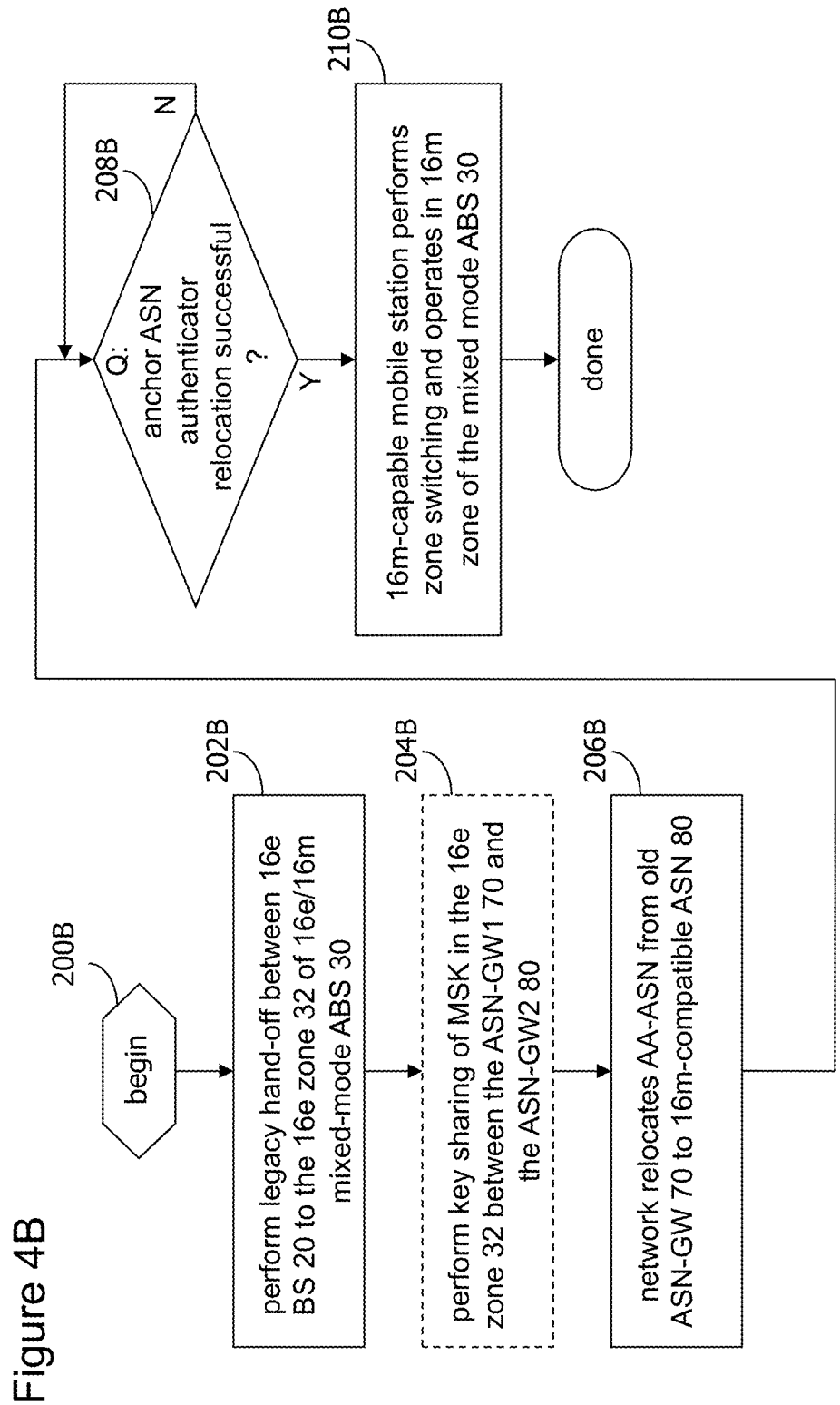

The root MSK will be the same and usable for both 802.16e and 802.16m, although it is only available to the ASN-GW that participates the (re)authentication procedure as the anchor. In FIG. 3A, the ASN-GW 70 has a MSK and a first PMK (under the 802.16e specification). The mixed-mode mobile station 90, however, desires to have the MSK and a second PMK (this time, under the 802.16m specification). Accordingly, in some embodiments, the zone switching method 100 provides two options for providing key security. FIG. 4A allows the ASN-GW 80 to get the MSK and the new PMK using re-authentication, along with anchor relocation. FIG. 4B allows the ASN-GW 80 to get the MSK via a key transfer from the ASN-GW 70, then letting the ASN-GW 80 derive the PMK by itself. The mechanisms depicted in FIGS. 4A and 4B are different from the protocol under the 802.16e specification and can only be done by the new ASN-GW 80 but not by the old ASN-GW 70.

For the mobility in the reverse direction, key re-derivation/refresh is also needed, but this can be done by either the legacy ASN-GW 70 or the mixed-mode ASN-GW 80, since the newer ASN gateway is backward compatible with the legacy gateway.

FIGS. 4A and 4B are flow diagrams depicting alternative embodiments of the anchor authenticator relocation 200 of the zone switching method 100 of FIG. 1. In FIG. 4A, either authentication or re-authentication is performed. In FIG. 4B, key sharing operations of the master session key are performed in lieu of (re)authentication.

Looking first at FIG. 4A, the relocation 200A commences when the mobile station 90 performs a legacy hand-off between the 16e base station 20 to the 16e zone 32 (downlink only) of the advanced (mixed-mode) base station 30 (block 202A). Subsequently, the network 50 initiates either an authentication or a re-authentication in the 16e zone 32 of the ABS 30 (block 204A), such that the ASN-GW 80 gets the MSK (from the legacy ASN-GW 70) and a new PMK. In some embodiments, the network initiates the (re)authentication when it notices that a 16m-capable mobile station 90 is in the region, as evidenced by the MAC version of the mobile station. The network 50 relocates the anchor authenticator ASN from the legacy ASN-GW 70 to the new mixed-mode ASN-GW 80 (block 206A). Once this relocation is successful (block 208A), the 16m-capable mobile station 90 is able to perform zone switching and operate in the 16m zone (34 for the downlink, 38 for the uplink, see FIG. 2) of the ABS 30 (block 210A). The zone switching operation may be initiated by the base station 30, or the base station may accept a zone switching request from the mobile station 90. In some embodiments, the (re)authentication procedure 200A does not interrupt regular data communications.

As an alternative, the network 50 may perform anchor authenticator-ASN relocation without using the authentication or re-authentication procedure 200A, as in the flow diagram 200B of FIG. 4B. Instead of performing authentication or re-authentication (block 204A), the network 50 performs key sharing of the master session key (MSK) between the old ASN-GW #1 70 and new ASN-GW #2 80 (block 204B), so that the new ASN-GW 80 has the root key which enables it to obtain other keys to operate the advanced mobile station 90 without requiring a (re)authentication. While possible to implement, this protocol may not be as secure as the (re)authentication procedure 200 described above. In addition, sharing the MSK may not be possible if the old AA-ASN 70 discards the MSK after deriving the PMK. In this circumstance, a re-authentication is later needed anyway for zone switching.

Maintaining Dual Security Context Sets in a Mixed-mode Base Station (for Zone Switching in Both Directions)

It is possible that the mobile station 90 and the anchor authenticator 60 will each retain two sets of valid context, one associated with the 16e state machine and the other associated with the 16m state machine. The two security context sets may share the same MSK, but two different PMKs.

Figure 5:
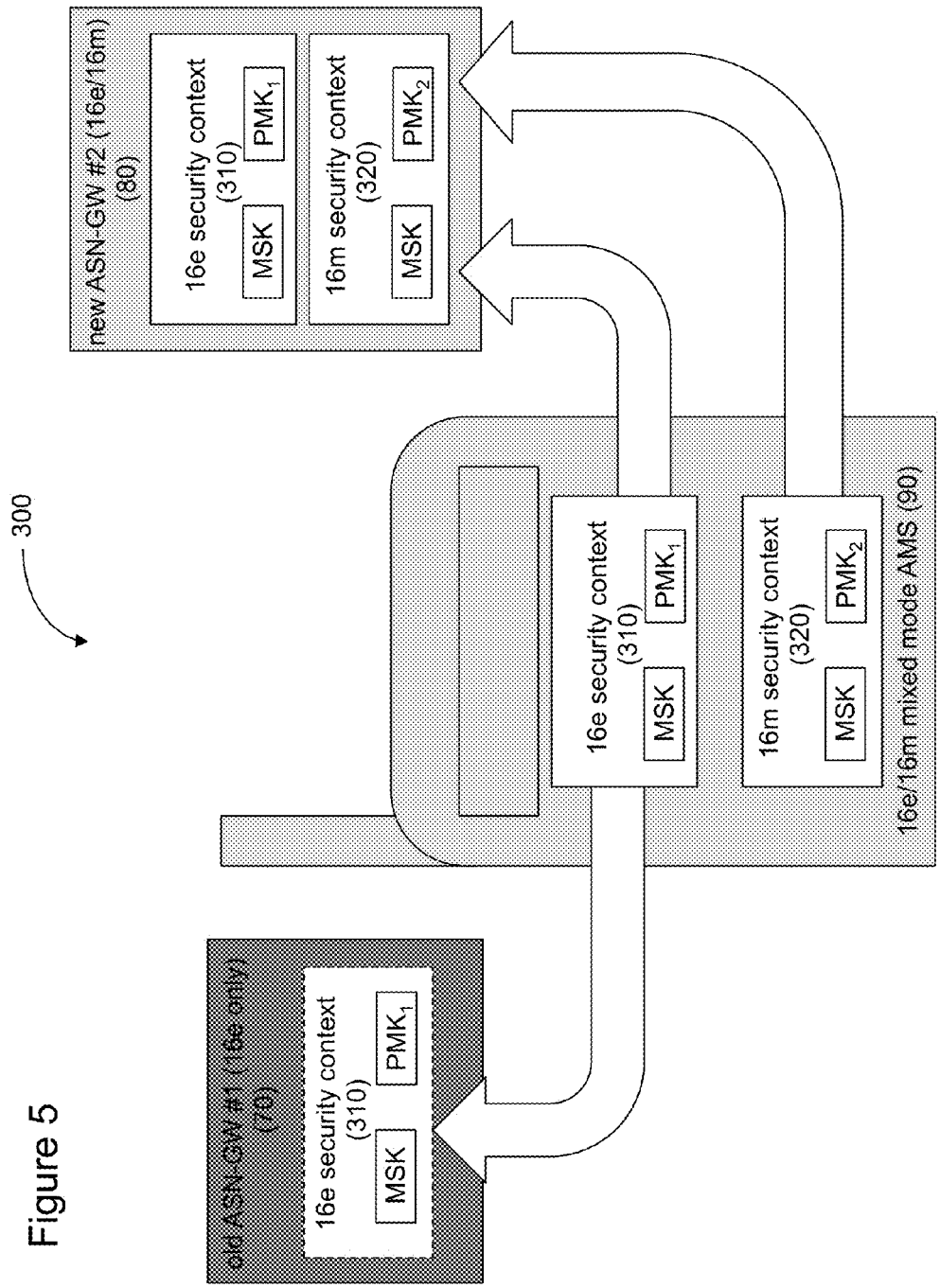
FIG. 5 is a schematic diagram of the dual security context maintenance of the zone switching method of FIG. 1 by the mobile station and network entities in the WiMAX network, according to some embodiments.

FIG. 5 is a schematic diagram of the dual security context maintenance 300 of the zone switching method 100 by the mobile station 90 and ASN-GWs in the WiMAX network 50, according to some embodiments. The mobile station 90 maintains a security context for both 802.16e and 802.16m (310, 320). The 802.16e security context 310 includes an MSK and a $PSK_1$ while the 802.16m security context 320 also includes the MSK, but a different $PSK_2$. The 802.16e security context 310 is maintained by the legacy ASN-GW 70, as expected. However, the mixed-mode ASN-GW 80 maintains both the 802.16e security context 310 and the 802.16m security context 320.

Thus, in addition to the anchor authenticator relocation 200, the zone switching method 100 maintains dual security contexts 300, allowing the mobile station to move seamlessly between 16e and 16m zones without expensive re-initialization operations having to take place with each zone switch.

The AA-ASN relocation operations described in FIGS. 4A and 4B above allow successful 16e-to-16m zone switching. However, the above procedures do not alone guarantee seamless operation of the mobile station 90. During a 16e-to-16m zone switch, the 16m key derivation requires the key agreement to refresh the PMK and derive other keys, such as the MSK, from the PMK. The key agreement transaction may take a few transactions between the AA-ASN 80 and the mobile station 90 and incurs delay. Therefore, it is desirable to perform the key agreement transaction before zone switching when the mobile station 90 is still in the 16e zone 22. This means, while having its current 16e security context actively in use, the mobile station 90 also obtains a valid 16m security context, in preparation for future zone switching. The implementation details for such signaling are discussed below.

Maintaining dual security context sets is also useful for zone switching in the other direction, namely, going from a 16m zone to a 16e zone, where the 16e traffic encryption keys (TEK) handshake procedure also incurs certain delays. Therefore, while being served in the 16m zone, the mobile station 90 may perform 16e security procedures to obtain a set of valid 16e keys and their context, for possible future 16m-to-16e zone switching.

Once the security context including key agreement is established for both 16e and 16m zones, in some embodiments, the mobile station 90 and network entity 80 maintain a copy of each, as illustrated in FIG. 5. For the same mobile station 90, the 16m security context 320 is maintained both in the mobile station 90 itself and in the 16m-compatible ASN 80, while the 16e security context 310 is maintained both in the mobile station 90 and in a physically different 16e-only (legacy) ASN 70.

Air Interface Procedure of Security Update for 16e-to-16m Zone Switching

Security Update During Zone Switching Using BBE

Once AA ASN relocation is done, the advanced mobile station's 16m MAC still has to obtain the 16m keys via the key agreement, so that a security update may properly be performed during zone switching. One simple approach is that the mobile station 90 stops communicating with the 16e zone 32 at some predetermined time, or action time, and then commences network reentry into the 16m zone 34, a so-called break-before-entry (BBE) operation. Under the BBE operation, the mobile station 90 finishes its required network procedures, such as capability negotiation, and refreshes the PMK via key agreement (if a valid 16m security context does not exist). Performing the security update during zone switching during BBE is the simplest approach described herein. However, this operation possibly incurs a latency, due to the required reentry procedures.

It is desirable to perform a security update during zone switching without interrupting data communications in the 16e zone. In some embodiments, the zone switching method 100 permits two possible enhanced air interface procedures, a security update for EBB-capable mobile stations 400 and a security update for those mobile stations that are not EBB-capable 500, as described below.

Security Update During Zone Switching Via EBB

Figure 6:
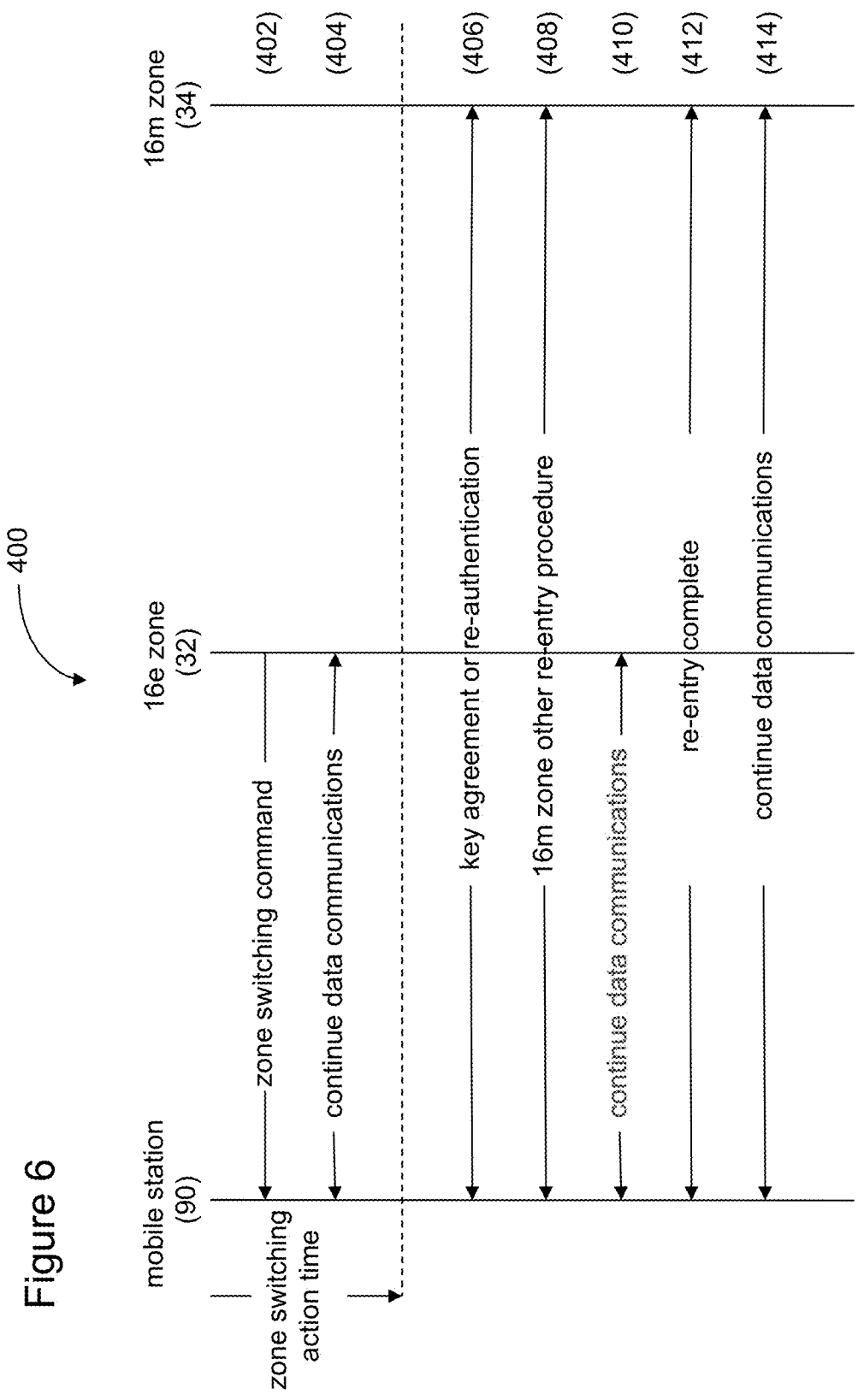
FIG. 6 is a time line showing a security update for an EBB-capable mobile station performed by the zone switching method of FIG. 1, according to some embodiments.

The security update may also be performed using entry-before-break (EBB). As shown in FIG. 6, if the mobile station 90 is capable of performing EBB operations, the mobile station may maintain regular data communications in the 16e zone, while performing network reentry procedures, including capability negotiation and/or security updates according to the 802.16m specification in the 16m zone 32. In some embodiments, this is achieved by leveraging the time division duplexing-multiplexed 16e zone and 16m zone at the 16e/16m mixed-mode advanced base station 30. The mobile station 90 may perform the EBB security update if it has sufficiently fast radio switching capability, enabling the mobile station to seamlessly communicate in the two zones without a significant switching gap.

Looking closely at time line 400 of FIG. 6, the 802.16m-capable mobile station 90 is shown using the 16e zone 32 or the 16m zone 34 (downlink only) of the advanced base station 30 to perform the security update during EBB. At the upper left side of the time line, the zone switching action time is shown. Recall that the zone switching action time is the time for the mobile station 90 to switch communicating in the 16e zone 32 and start communicating in the 16m zone 34. The base station 30 may, for example, communicate to the mobile station 90 to perform the zone switching within a predetermined number of frames, which would be the zone switching action time.

During this action time, the zone switching command is initiated (402), with the operations of FIG. 2, described above, being performed. Data communications by the mobile station in the 16e zone 32 continues at this time (404). After the zone switching occurs, the mobile station 90 performs key agreement or re-authentication in the 16m zone 34 (406). Other re-entry procedures in the 16m zone 34 are also performed (408). Due to its fast switching capability, the mobile station 90 is able to simultaneously communicate in the 16e zone 32 and in the 16m zone 34. During the performance of the security agreement protocol and other negotiations in the 16m zone, data communication in the 16e zone 32 by the mobile station 90 may continue (410, shown in red). Once the re-entry procedures have been completed (412), data communication continues, now exclusively in the 16m zone 34 rather than in the 16e zone 32 (414), since the necessary security initializations have taken place to allow the mobile station 90 to use its enhanced 802.16m features.

The EBB zone switching procedure 400 of FIG. 6 is distinguishable from the BBE zone switching procedure described above in that data communication in the 16e zone 34 continues (410, as shown in red) after the zone switching action time. Under the BBE protocol, data communication in the 16e zone would cease before the network reentry into the 16m zone commences.

Security Update Before Zone Switching

Figure 7:
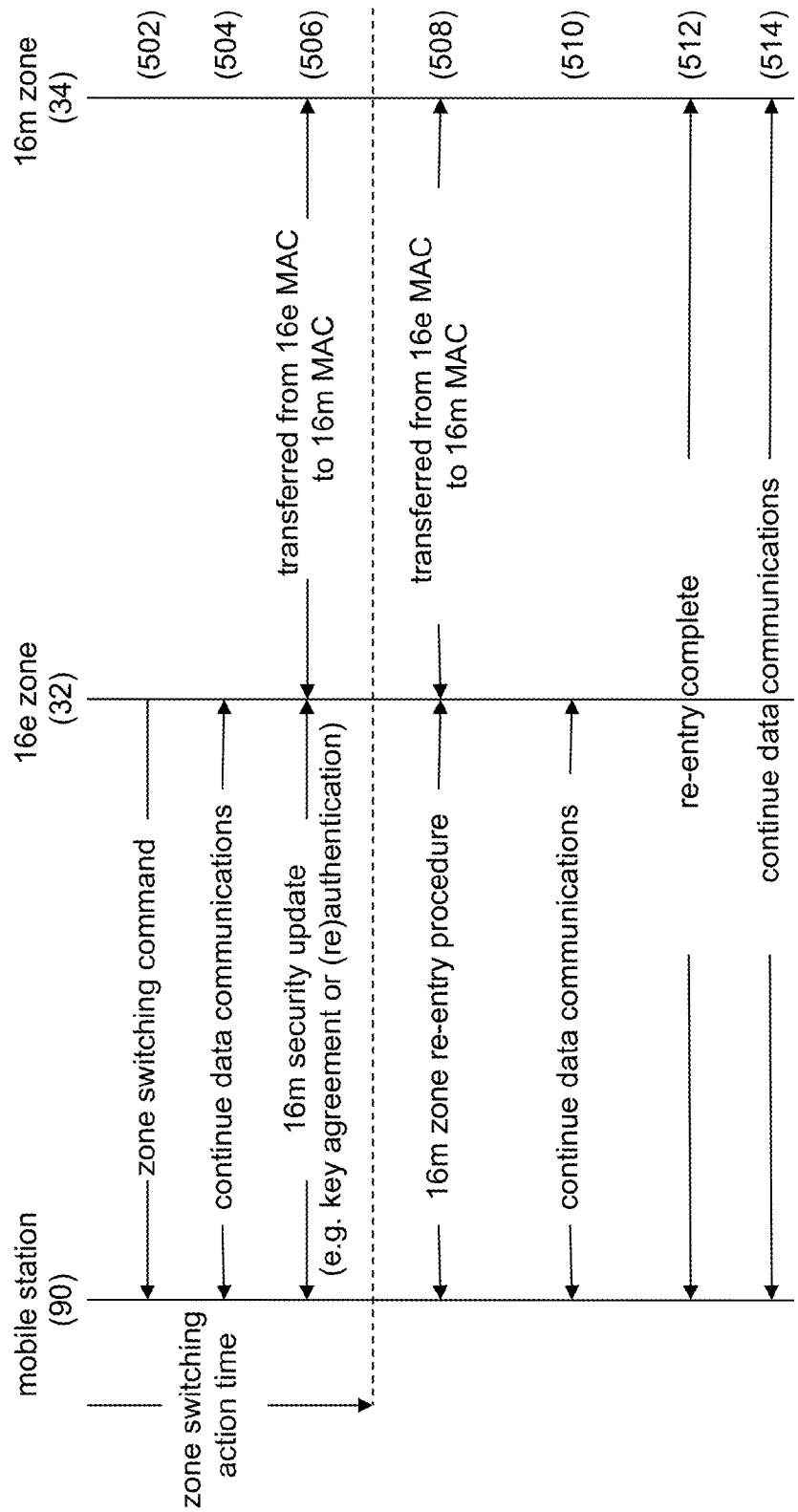
FIG. 7 is a time line showing a security update for a not-EBB-capable mobile station performed by the zone switching method of FIG. 1, according to some embodiments.

To reduce the requirement on mobile station capability, the security update may also be performed in the zone switching preparation phase or even before that, as shown in FIG. 7, according to some embodiments. As before, the zone switching command is initiated (502) during the zone switching action time. Data communications in the 16e zone 32 continues (504). The 16m MAC of the mixed-mode base station 30 (not shown) talks with the 16m mobile station 90 in the base station's 16e zone 32 to obtain a new 802.16m PMK (using a 16m "language"), e.g., via a key agreement procedure, before the zone switching action time (506). The 802.16e MAC is merely a transport of the security update for the 802.16m MAC of the base station 30 (506).

Some steps in the re-authentication are different between 802.16e and 802.16m. That means, if the mobile station 90 wants to do a 802.16m security update, it should talk in the 802.16m zone using an 802.16m language. However, this causes a service interruption. Therefore, the zone switching method 100 allows the mobile station to talk in the 802.16e zone, but using the 802.16m language, which is feasible since the advanced base station 30 supports both 802.16e and 802.16m.

To enable these transfers between the 802.16e zone 32 and the 802.16m zone 34, in some embodiments, the ABS 30 has an internal link between its 802.16m state machine and its 802.16e state machine, enabling the two state machines to interact. And the term, "transferred" in FIG. 7 refers to this internal link. In other embodiments, the link is not maintained between the state machines. Where the optimization of FIG. 7, steps 506 and 508 are desired however, such a link is presumed.

Once the zone switching action time is over, the mobile station 90 performs other re-entry procedures. However, the 802.16m zone re-entry procedures are performed in the 802.16e zone, updating the 802.16e MAC in the base station 30, and then this 802.16e MAC update is transferred to the 802.16m MAC (508). Communication in the 802.16e zone continues (510). Once re-entry is complete (512), subsequent data communications may happen in the 802.16m zone (514). In some embodiments, the method 500 of FIG. 7 is also applied to other required network reentry procedures, such as capability negotiation.

The general problem of "talking the 16m language in the 16e zone" (508) may be solved in different ways. For example, new TLVs (that only the 16m MAC understands) may be added into the existing 16e MAC management messages. TLV is short for time-length-value, and is a generic encoding format used in 802.16. Based on the new TLV type, the mobile station 90 or the base station 30 realizes that 16m signaling is taking place. The legacy base station 20 would not recognize the new TLVs and would thus not process them. Another option is to define and use new MAC management messages (new types and associated formats) directly. For example, a level two (L2) transfer message, which does not exist in 16e, may be used. In some embodiments, the method 100 uses a new sub-type in the L2 tunnel called, "16m signaling", so that the mobile station 90/base station 30 may parse the information properly, knowing this is supposed to be a 16m MAC control message.

Still another option is to use level three (L3) control information. In this case, the 16m MAC control message is carried in transport connection as an internet protocol (IP) payload in the 16e zone 32. The mobile station 90/base station 30 obtains and parses the L3 information and subsequently performs corresponding operations.

Zone Switching from 16m to 16e Zone

When the mobile station 90 is switching back from 802.16m to 802.16e operation, the relocation of the anchor authenticator ASN in the network is unnecessary, since the new ASN-GW 80 is backward compatible and supports both 16e and 16m. Thus, the ASN-GW 80 can remain as the anchor authenticator while the mobile station 90 operates in the legacy (802.16e) mode, as well as when it operates in the newer (802.16m) mode.

By maintaining two sets of security contexts 310, 320 (FIG. 5), once 16e-to-16m switching is achieved, switching in the other direction, from 16m-to-16e is routine, and the authentication and update procedures described above are avoided, in some embodiments. For example, the 802.16e legacy TEK 3-way handshake may be allowed in the 802.16m zone 34 to construct the 802.16e context, in order to reduce latency when doing zone switching from the 802.16m zone 34 to the 802.16e zone 32.

The above operations ensure that the mobile station 90 and the 16e MAC entity of the mixed-mode base station 30 obtain valid keys according to the IEEE 802.16e specification. Detailed signaling may be different, e.g., the 802.16e standard does not have a key agreement but instead has TEK 3-way handshaking, and so on. Further, it is possible to derive a key using the following formula:

$$PMK_{LZONE} = Dot16KDF(PMK_{MZONE}, \text{"PMK for LZONE"})$$

to obtain LZone/MZone security separation without doing an re-authentication, where LZone refers to the "legacy" zone or 802.16e zone and MZone refers to the 802.16m zone. The L2 transfer approach, if used, needs another sub-type of "16e signaling" so that the mobile station 90/base station 30 operating in the 16m zone understand the information tunneled inside is going to be in the "16e language".

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A zone switching method, comprising:
    performing, by a mixed-mode mobile station, a handover from a legacy frame structure of a legacy base station to a 802.16e zone of a mixed-mode frame structure of the mixed-mode base station, wherein the legacy base station supports an 802.16e standard and the mixed-mode base station supports both 802.16e and 802.16m standards;
    causing, by the mixed-mode mobile station, an anchor authenticator to be relocated from a legacy access service network gateway to a mixed-mode access service network gateway, wherein the legacy access service network gateway supports the 802.16e standard and the mixed-mode access service network gateway supports both 802.16e and 802.16m standards;
    performing, by the mixed-mode mobile station, a security update, resulting in a mixed-mode security context for operating in an 802.16m zone of the mixed-mode frame structure of the mixed-mode base station, the security update further comprising:
        allowing a zone switching action time to elapse;
        performing a key agreement, an authentication, or a re-authentication in the 802.16m zone, wherein data communication with the mixed-mode base station in the 802.16e zone is not interrupted;
        performing additional re-entry procedures in the 802.16m zone, wherein data communication with the mixed-mode base station in the 802.16e zone is not interrupted; and
        switching to communication in the 802.16m zone by the mixed-mode base station once the re-entry procedures are complete; and
    switching, by the mixed-mode mobile station, from the 802.16e zone of the mixed-mode frame structure to the 802.16m zone of the mixed-mode frame structure;
    wherein data communication using the 802.16e zone is not disrupted during the above operations.

2. The zone switching method of claim 1, causing the anchor authenticator to be relocated further comprising:
    performing, by the mixed-mode mobile station, an authentication in the 802.16e zone of the mixed-mode base station, wherein the authentication triggers the relocation of the anchor authenticator from the legacy access service network gateway to the mixed-mode access service network gateway.

3. The zone switching method of claim 2, performing, by the mixed-mode mobile station, an authentication in the mixed-mode base station further comprising:
    establishing, by the mixed-mode mobile station, a master session key and a pairwise master key with the mixed-mode access service network gateway; and
    establishing, by the mixed-mode mobile station, an authentication key with the mixed-mode base station.

4. The zone switching method of claim 1, causing, by the mixed-mode mobile station, the anchor authenticator to be relocated further comprising:
    performing, by the mixed-mode mobile station, a re-authentication in the 802.16e zone of the mixed-mode base station, wherein the re-authentication triggers the relocation of the anchor authenticator from the legacy access service network gateway to the mixed-mode access service network gateway.

5. The zone switching method of claim 4, performing, by the mixed-mode mobile station, a re-authentication in the mixed-mode base station further comprising:
    establishing, by the mixed-mode mobile station, a master session key and a pairwise master key with the mixed-mode access service network gateway; and
    establishing, by the mixed-mode mobile station, an authentication key with the mixed-mode base station.

6. The zone switching method of claim 1, causing, by the mixed-mode mobile station, the anchor authenticator to be relocated further comprising:
   performing, by the mixed-mode mobile station, a key agreement in the 802.16e zone of the mixed-mode base station, wherein the key agreement triggers the relocation of the anchor authenticator from the legacy access service network gateway.

7. The zone switching method of claim 6, performing, by the mixed-mode mobile station, a key agreement in the 802.16e zone further comprising:
   transferring, by the mixed-mode mobile station, a master session key from the legacy access service network gateway to the mixed-mode access service network gateway; wherein the mixed-mode access service network gateway derives a pairwise master key from the master session key.

8. A zone switching method comprising:
   performing, by the mixed-mode mobile station, a handover from a legacy frame structure of a legacy base station to a 802.16e zone of a mixed-mode frame structure of a mixed-mode base station, wherein the legacy base station supports an 802.16e standard and the mixed-mode base station supports both 802.16e and 802.16m standards;
   causing, by the mixed-mode mobile station, an anchor authenticator to be relocated from a legacy access service network gateway to a mixed-mode access service network gateway, wherein the legacy access service network gateway supports the 802.16e standard and the mixed-mode access service network gateway supports both 802.16e and 802.16m standards;
   performing, by the mixed-mode mobile station, a security update, resulting in a mixed-mode security context for operating in an 802.16m zone of the mixed-mode frame structure of the mixed-mode base station, the security update further comprising:
      performing a key agreement, an authentication, or a re-authentication to produce an 802.16m security context in the 802.16e zone during a zone switching action time, wherein data communication with the mixed-mode base station in the 802.16e zone is not interrupted;
      transferring the 802.16m security context between an 802.16e medium access controller and an 802.16m medium access controller;
      transmitting the 802.16m security context and related signaling of the 802.16e zone of the mixed-mode base station, wherein the two medium access controllers are in the mixed-mode base station;
      performing additional re-entry procedures in the 802.16e zone to produce additional 802.16m security context, wherein the additional re-entry procedures are performed either during or after the zone switching action time;
      transferring the additional 802.16m security context of the additional re-entry procedures between the 802.16e medium access controller and the 802.16m medium access controller;
      transmitting the 802.16m security context and related signaling of the 802.16e zone of the mixed-mode base station; and
      switching to communication in the 802.16m zone by the mixed-mode base station once the re-entry procedures are complete; and
   switching, by the mixed-mode mobile station, from the 802.16e zone of the mixed-mode frame structure to the 802.16m zone of the mixed-mode frame structure;
wherein data communication using the 802.16e zone is not disrupted during the above operations.

9. The zone switching method of claim 8, further comprising:
   maintaining, by the mixed-mode mobile station, a copy of a legacy security context by the legacy access service network gateway;
   storing, by the mixed-mode mobile station, a copy of the legacy security context by the mixed-mode access service network gateway; and
   storing, by the mixed-mode mobile station, a copy of the 802.16m security context in the mixed-mode access service network gateway.

10. The zone switching method of claim 9, further comprising:
    operating, by the mixed-mode mobile station, in the 802.16m zone of the mixed-mode base station; and
    switching, by the mixed-mode mobile station, back to the 802.16e zone of the mixed-mode base station using the stored 802.16e and 802.16m security contexts in the mixed-mode access service network gateway.

11. A zone switching method, comprising:
    performing, by a base station, a handover from a legacy frame structure to a 802.16e zone of a mixed-mode frame structure, the legacy and mixed-mode frame structures being used by a mixed-mode mobile station, wherein the mixed-mode mobile station supports both an 802.16e standard and an 802.16m standard;
    causing, by the base station, an anchor authenticator to be relocated from a legacy access service network gateway to a mixed-mode access service network gateway, wherein the legacy access service network gateway supports the 802.16e standard and the mixed-mode access service network gateway supports both 802.16e and 802.16m standards;
    performing, by the base station, a security update, resulting in a mixed-mode security context for operating in an 802.16m zone of the mixed-mode frame structure, the security update further comprising:
       allowing a zone switching action time to elapse;
       performing a key agreement, an authentication, or a re-authentication in the 802.16m zone, wherein data communication with the mixed-mode mobile station in the 802.16e zone is not interrupted;
       performing additional re-entry procedures in the 802.16m zone, wherein data communication with the mixed-mode mobile station in the 802.16e zone is not interrupted; and
       switching to communication in the 802.16m zone by the mixed-mode mobile station once the re-entry procedures are complete; and
    switching, by the base station, from the 802.16e zone of the mixed-mode frame structure to the 802.16m zone of the mixed-mode frame structure;
wherein data communication using the 802.16e zone is not disrupted during the above operations.

12. The zone switching method of claim 11, causing, by the base station, the anchor authenticator to be relocated further comprising:
    performing, by the base station, an authentication in the 802.16e zone, wherein the authentication triggers the relocation of the anchor authenticator from the legacy access service network gateway to the mixed-mode access service network gateway.

13. The zone switching method of claim 12, performing, by the base station, an authentication further comprising:

establishing, by the base station, a master session key and a pairwise master key with the mixed-mode access service network gateway; and establishing, by the base station, an authentication key.

14. The zone switching method of claim 11, causing, by the base station, the anchor authenticator to be relocated further comprising:

performing, by the base station, a re-authentication in the 802.16e zone, wherein the re-authentication triggers the relocation of the anchor authenticator from the legacy access service network gateway to the mixed-mode access service network gateway.

15. The zone switching method of claim 14, performing, by the base station, a re-authentication further comprising:

establishing, by the base station, a master session key and a pairwise master key with the mixed-mode access service network gateway; and establishing, by the base station, an authentication key with the mixed-mode mobile station.

16. The zone switching method of claim 11, causing, by the base station, the anchor authenticator to be relocated further comprising:

performing, by the base station, a key agreement in the 802.16e zone, wherein the key agreement triggers the relocation of the anchor authenticator from the legacy access service network gateway.

17. The zone switching method of claim 16, performing, by the base station, a key agreement in the 802.16e zone further comprising:

transferring, by the base station, a master session key from the legacy access service network gateway to the mixed-mode access service network gateway;

wherein the mixed-mode access service network gateway derives a pairwise master key from the master session key.

18. A zone switching method comprising:

performing, by a base station, a handover from a legacy frame structure to a 802.16e zone of a mixed-mode frame structure, the legacy and mixed-mode frame structures being used by a mixed-mode mobile station, wherein the mixed-mode mobile station supports both an 802.16e standard and an 802.16m standard;

causing, by the base station, an anchor authenticator to be relocated from a legacy access service network gateway to a mixed-mode access service network gateway, wherein the legacy access service network gateway supports the 802.16e standard and the mixed-mode access service network gateway supports both 802.16e and 802.16m standards;

performing, by the base station, a security update, resulting in a mixed-mode security context for operating in an 802.16m zone of the mixed-mode frame structure, the security update further comprising:

performing a key agreement, an authentication, or a re-authentication to produce an 802.16m security context in the 802.16e zone during a zone switching action time, wherein the 802.16m security context is transferred between an 802.16e medium access controller and an 802.16m medium access controller;

transmitting the 802.16m security context and related signaling of the 802.16e zone;

performing additional re-entry procedures in the 802.16e zone to produce additional 802.16m security context, wherein the additional re-entry procedures are performed either during or after the zone switching action time;

transferring the additional 802.16m security context of the additional re-entry procedures between the 802.16e medium access controller and the 802.16m medium access controller;

transmitting the 802.16m security context and related signaling of the 802.16e zone; and switching to communication in the 802.16m zone by the mixed-mode mobile station once the re-entry procedures are complete; and switching, by the base station, from the 802.16e zone of the mixed-mode frame structure to the 802.16m zone of the mixed-mode frame structure;

wherein data communication using the 802.16e zone is not disrupted during the above operations.

* * * * *

UNITED STATES PATENT AND TRADEMARK OFFICE
CERTIFICATE OF CORRECTION

PATENT NO. : 8,451,799 B2
APPLICATION NO. : 12/855400
DATED : May 28, 2013
INVENTOR(S) : Xiangying Yang et al.

Page 1 of 1

It is certified that error appears in the above-identified patent and that said Letters Patent is hereby corrected as shown below:

On the title page, item (56), in column 2, under "Other Publications", line 17, delete "Use" and insert -- User --, therefor.

Signed and Sealed this
Twentieth Day of August, 2013

Teresa Stanek Rea
*Acting Director of the United States Patent and Trademark Office*